Aug. 31, 1965     D. J. ROGUS     3,203,222
TORQUE CALIBRATING GAUGE
Filed May 14, 1962     2 Sheets-Sheet 1
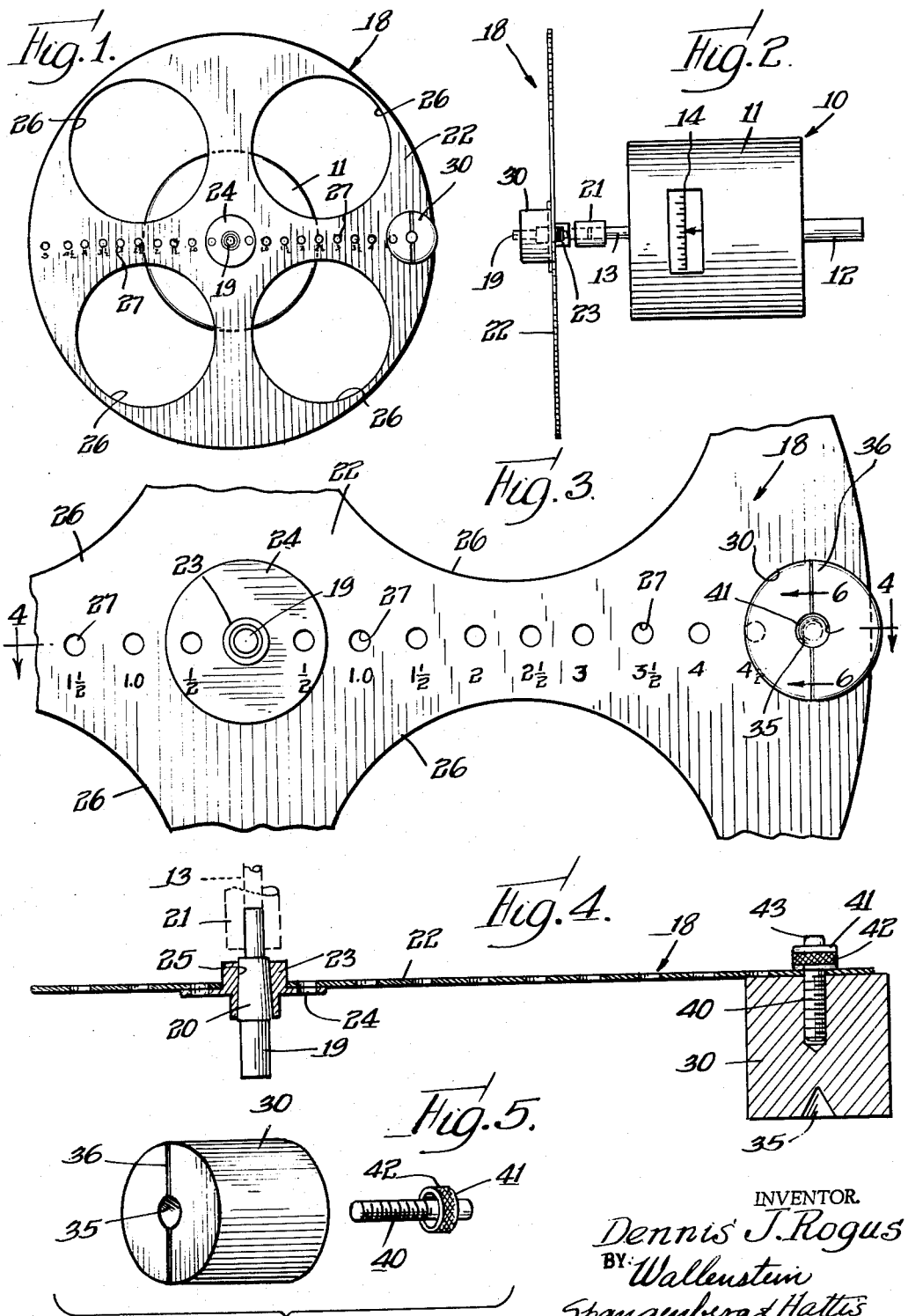
INVENTOR.
Dennis J. Rogus
BY Wallenstein
Spangenberg & Hattis
Attys.

Aug. 31, 1965  D. J. ROGUS  3,203,222
TORQUE CALIBRATING GAUGE
Filed May 14, 1962  2 Sheets-Sheet 2

INVENTOR.
Dennis J. Rogus
BY Wallenstein
Spangenberg & Hattis
Attys

3,203,222
Patented Aug. 31, 1965

3,203,222
TORQUE CALIBRATING GAUGE
Dennis J. Rogus, Chicago, Ill., assignor to Power Instruments Incorporated, Skokie, Ill., a corporation of Illinois
Filed May 14, 1962, Ser. No. 194,417
10 Claims. (Cl. 73—1)

The principal object of this invention is to provide a torque calibrating gauge for calibrating torque responsive devices, such as torque meters, torque wrenches, torque couplings or the like, which is simple and inexpensive in construction, which is readily connected to the torque responsive device, which is readily set up for desired torque values, which is easily operated, and which is extremely accurate in construction and operation.

Briefly, the torque calibrating gauge of this invention for calibrating torque responsive devices comprises a balanced assembly which includes a horizontal shaft adapted to be connected to the output member of the torque responsive devices to be rotated thereby, and a vertical disc concentrically secured to the shaft and having a plurality of holes regularly spaced along a diameter of the disc on each side of the center of the disc. The torque calibrating gauge also includes a plurality of balanced weights of regularly graduated values and these weights have extensions thereon which are receivable in the holes of the disc for mounting the weights on the disc. The weights are selectively mounted in selected holes along the diameter of the disc for providing desired selected weight times distant torque moments resisting rotation of the shaft by the output member of the torque responsive device when the diametrically arranged holes in the disc are horizontally positioned.

The distances between the diametrically arranged holes in the disc and the values of the various weights depend upon the type of calibration desired, for example, for torque calibrations in ounce-inches, the holes are regularly spaced at inch or half inch intervals and the regularly graduated values of the weights are ounces and fractions of ounces, and for torque calibrations in gram-centimeters, the holes are regularly spaced at centimeter intervals and the regularly graduated values of the weights are grams and fractions of grams. Indicia are preferably provided for the holes for indicating their distances from the center of the disc and, likewise, the weights are preferably marked as to their weight values so that the torque calibrating gauge may be readily and accurately set up. If desired, for example, two sets of holes may be provided on the disc, one for ounce-inches and the other for gram centimeters, so that the same torque calibrating gauge can be used for both types of torque calibrations. The torque calibrating gauge may be used for calibrating torques in either direction of rotation and selected weights may be applied to either or both sides of the center of the disc in desired combinations to obtain substantially any desired torque calibration value.

The shaft and disc assembly is accurately balanced about its central axis so as to have no effect upon the torque calibration and, preferably, it is provided with pairs of diametrically opposed openings to reduce the mass and hence the inertia thereof. The various weights are accurately dimensioned and the weight values thereof accurately determined, and the holes in the disc are accurately positioned along the diameter with respect to each other and the center of the disc. As a result, very accurate alignment of the torque center with the pivot center and the elimination of side loading errors are afforded. Thus, when the shaft of the torque calibrating gauge is concentrically connected to the output member of the torque responsive device, the latter may be accurately calibrated in a simple, straightforward and foolproof manner.

For calibrating sensitive torque responsive devices of low torque, where the weight values of the weights are relatively small, the shaft of the torque calibrating gauge is preferably directly secured to and carried by the output member of the torque responsive device concentrically therewith, so as to prevent the introduction of friction and accurately align the rotation axes of the shaft and the output member. However, for calibrating other torque responsive devices, where the weight values of the weights are relatively high, the shaft of the torque responsive gauge is preferably rotatably mounted in suitable anti-friction bearings so that the weights will not place any side loading on the bearings for the output member of the torque responsive device. Here, the torque calibrating gauge and the torque responsive device are preferably suitably jigged with respect to each other so that the axes of the shaft and the output member are accurately aligned when the shaft and output member are connected together.

The various weights are preferably cylindrical in configuration and provided at one end with substantially cylindrical axially extending extensions which are received in the holes in the disc for mounting the weights on the weights on the disc, the weights being balanced about their longitudinal axes. The extensions of the weights are also preferably tapered so as to be accurately received in the holes, and in the case of the smaller weights, their tapered extensions may be pressed-fit into the holes for securing the weights on the disc. However, the larger weights preferably have their extensions internally tapped to receive headed screws for securing the weights on the disc, and in this latter respect, the weight of the screws, which is also accurately determined, is included in the weight values of the weights.

Further objects of this invention reside in the details of construction of the torque calibrating gauge and in the cooperative relationship between the component parts thereof.

Other objects and advantages of this invention will become apparent to those skilled in the art upon reference to the accompanying specification, claims and drawings in which:

FIG. 1 is a front elevational view of the torque calibrating gauge of this invention directly connected to and supported by a torque responsive device;

FIG. 2 is a side elevational view of the torque calibrating gauge and the torque responsive device looking from the right of FIG. 1;

FIG. 3 is an enlarged partial view of the torque calibrating gauge illustrated in FIG. 1;

FIG. 4 is a horizontal sectional view taken substantially along the line 4—4 of FIG. 3;

FIG. 5 is an exploded perspective view of one of the weights and its mounting screw;

Figure 6:
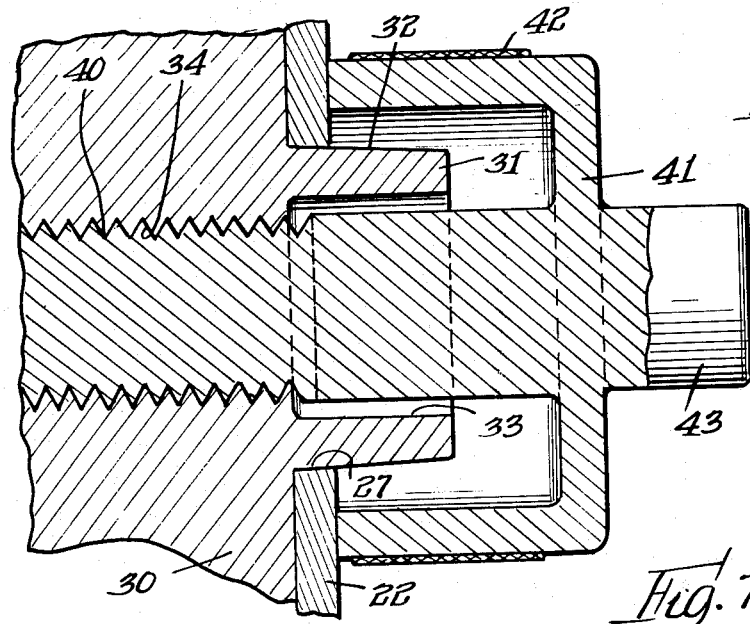
FIG. 6 is an enlarged sectional view taken substantially along line 6—6 of FIG. 3 showing one manner of mounting the weight on the disc.

Referring first to FIGS. 1 and 2, a torque responsive device, such as a torque meter, torque wrench, torque coupling or the like, is generally designated at 10. The torque responsive device may be of any type or kind but generally it is shown for purposes of illustration to include a body 11, an input member 12 and an output member 13, the input member and the output member being connected together through a torque responsive means. The torque responsive device 11 also usually includes a torque indicating device 14 which indicates the amount of torque being transmitted from the input member 12 to the output member 13 upon rotation of the same. The indicating device 13 is usually calibrated to provide an accurate indication of the torque being transmitted.

The torque calibrating gauge, which is utilized for the purpose of calibrating the torque responsive device 11, is generally designated at 18 in FIGS. 1 to 4. It includes a horizontally arranged shaft 19 which, as shown in FIG. 2, is directly connected to and supported by the output member 13 of the torque responsive device 11 by means of a suitable coupling member 21. The shaft 19 is also provided intermediate its ends with a tapered portion 20 and it is preferably formed from a hardened stainless steel or high carbon steel or the like. The torque calibrating gauge also includes a disc 22 which is also preferably formed of hardened stainless steel or the like. The disc 22 is relatively thin, as for example, .031 inch for an 11 inch diameter disc and is provided with two pairs of enlarged diametrically opposed openings 26 therein so as to maintain the mass and inertia of the disc at a minimum. The disc 22 is provided with a central hole which receives a hub 23 which is also preferably formed of hardened stainless steel. The hub 23 is provided with a flange 24 to which the disc 22 is suitably secured as by spot welding. The hub 23 is provided with an internal taper 25 in which the tapered portion 20 of the shaft 19 is forced fit. Thus, the shaft 19, the hub 23 and the disc 22 provide a unitary assembly which is accurately balanced about the central axis thereof.

The disc 22 is also provided with a plurality of holes 27 which are regularly spaced along a diameter of the disc on each side of the center of the disc. For purposes of illustration herein, the holes 27 are regularly spaced at ½ inch intervals along the diameter and the disc is provided adjacent these holes with suitable indicia for indicating the distance of each hole from the center of the disc, the indications being in ½ inch steps. These holes 27 are accurately jig bored so as to provide accurate sizing of the holes and accurate spacing of the holes.

The torque calibrating gauge 18 of this invention also includes a plurality of weights 30 of regularly graduated values. Preferably, these weights 30 are cylindrical in configuration and are provided centrally at one end with a substantially cylindrical extension 31. Preferably, the outer surface 32 of the extension 31 is tapered so as to accurately fit into the holes 27 in the disc 22, as illustrated in FIG. 6. The weights 30 and their extensions 31 are preferably formed of hardened stainless steel and are turned and ground about their longitudinal central axes. The extensions 31 are preferably hollow as indicated at 33 and the weights at the extensions are preferably provided with tapped holes 34. The other ends of the weights 30 are preferably provided with central conical recesses 35. The cylindrical weights 30 and their extensions 31 are made concentric about their longitudinal central axes so as to be balanced thereabout. In constructing the weights 30 they are preferably horizontally rotatably mounted at the openings 33 in the extensions 31 and the conical recesses 35 and checked for weight value and for balance about their central horizontal axes, and are appropriately ground, if necessary, to provide accurate weight value and balance. In the event that there should be a slight unbalance in any weight, the heavier part of the weight swings by gravity to a point below the horizontal axis. The end of the weight is thereupon provided with a vertical scribe line 36 to indicate this condition. When such a weight is thereafter applied to the disc 22, the scribe line 36 is positioned at right angles to the diameter containing the holes 27 so that the center of gravity of the weight is accurately positioned at exact desired distances from the center of the disc.

Figure 7:
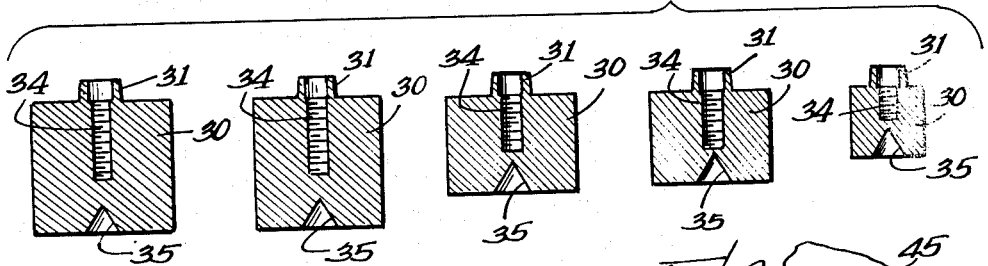
FIG. 7 is a sectional view through a plurality of weights of different weight values which are selectively secured to the disc in the manner illustrated in FIG. 6.

The larger weights 30 are secured in place on the disc 22 by screws 40. Each screw 40 contains a threaded shank which is threaded into the tapped hole 34 in the weight 30, and is also provided with a head 41 which is preferably cup-shaped as shown in FIG. 6. The flange portion of the cup-shaped head 41 engages the disc 22 for firmly clamping the disc 22 between the head 41 and the weight 30 for securely mounting the weight on the disc. To assist in rotating the screw 40, the flanged portion of the head 41 is knurled, as indicated at 42. The head 41 of the screw, which is also preferably formed of hardened stainless steel or the like, is also provided with an extension 43 which may be ground off as required to fix the weight of the screw. Preferably, the weight of the screw, in the particular form under consideration here, is made .125 ounce, and this weight value can be readily obtained by appropriate grinding of the extension 43. The screw is also balanced about its longitudinal central axis. In accordance with the construction here under consideration, the weight values of the weights are in ounces and fractions of ounces, as for example, 8, 5, 4, 3, 2, .5, .25 and .20 ounces and these weight values include the weight of the securing screw 40. Several sizes of such weights are illustrated in FIG. 7.

Figure 8:
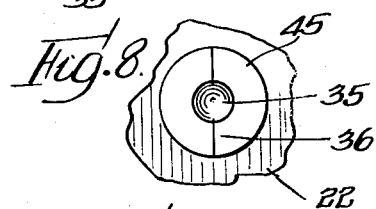
FIG. 8 is a front elevational view of a different form of weight, which form is utilized preferably for weights of smaller weight value.
Figure 9:
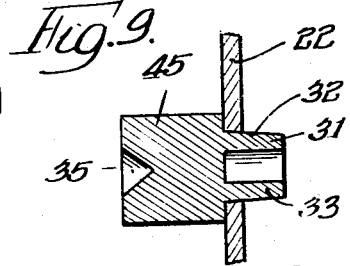
FIG. 9 is a sectional view of the weight of FIG. 8 illustrating the manner of mounting it on the disc.

For the smaller size weights, the securing screw may be omitted and such a smaller sized weight is illustrated at 45 in FIGS. 8 and 9. These smaller sized weights 45 are like the larger sized weights 30 with the exception that the tapped holes 34 are omitted therefrom and the securing screws are not utilized. Accordingly, like reference characters have been utilized for like parts. Here, the smaller sized weights 45 are held in place in the holes 27 in the disc 22 by the pressed fit between the tapered sides 32 of the extensions 31 and the holes 27.

By utilizing various sized weights 30 and 45 in the various holes 27 in the disc 22, desired weight times distance torque moments may be obtained. For example, for a 7.20 ounch-inch torque calibration moment, weights of .10, .25, .50, 1.0 and 3.0 ounces may be utilized. Here, a 3 ounce weight may be mounted at 2 inches from the hub for a 6 ounce-inch moment, a 1 ounce weight at 1 inch for a 1 ounce-inch moment, and a .50 ounce weight at .5 inch for a .25 ounce-inch moment to provide a total moment of 7.25 ounce-inches. Then a .10 ounce weight is mounted on the other side of the disc at .5 inch thus substracting a .05 ounce-inch moment to obtain the 7.20 ounce-inch net torque moment. By appropriately mounting the weights in the holes 22 on one or the other sides of the disc, torque calibrating moments may be set for either direction of rotation of the disc.

Figure 10:
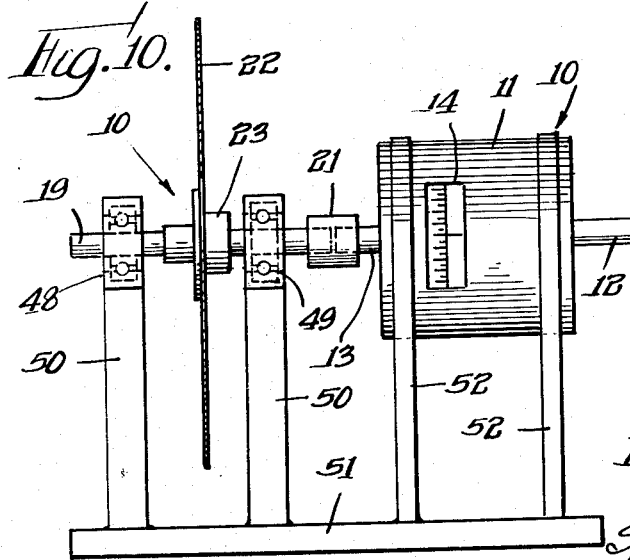
FIG. 10 is a side elevational view similar to FIG. 2, but illustrating an arrangement wherein the torque calibrating gauge is rotatably supported by anti-friction bearings.

Instead of mounting the torque calibrating gauge 18 directly on the output member 13 of the torque responsive device 11 so as to be directly supported thereby, the torque calibrating gauge may be independently mounted as illustrated in FIG. 10. Here the shaft 19 projecting from either side of the hub 23 may be mounted in antifriction bearings 48 and 49 carried by suitable supports 50 on a frame 51. The torque responsive device 11 may be likewise mounted on suitable supports 52 on the frame so as to hold its output member 13 in coaxial alignment with the shaft 19, the output member 13 and the shaft 19 being coupled together by suitable coupling 21. This independent supporting of the torque calibrating gauge 18 is desirable where heavy torque calibrations are required, utilizing relatively heavy weights in the torque calibrating gauge, to thereby eliminate side loading of the bearing for the output member 13 of the torque responsive device.

In both arrangements, as illustrated in FIGS. 1 and 2 and in FIG. 10, the torque calibrating gauge 18 provides a desired selected weight times distance torque moment which resists rotation of the output member 13 of the torque responsive device 11 when the diametrically arranged holes 27 in the disc 22 are horizontally positioned. When this selected torque resistance is applied to the output member 13 and the input member 12 is rotated, the indicating device 14 on the torque responsive device 11 may then be adjusted to correspond to the resisting torque provided by the torque calibrating gauge and, in this way, the torque responsive device may be readily and easily calibrated.

While for purposes of illustration several forms of this invention have been disclosed, other forms thereof may become apparent to those skilled in the art upon reference to this disclosure and, therefore, this invention should be limited only by the scope of the appended claims.

I claim:

1. A torque calibrating gauge for calibrating a torque responsive device comprising a balanced assembly including a horizontal shaft adapted to be connected to the output member of the torque responsive device to be rotated thereby, and a vertical disc concentrically secured to the shaft and having a plurality of holes regularly spaced along a diameter of the disc on each side of the center of the disc, and a plurality of balanced weights of regularly graduated values having extensions thereon receivable in the holes of the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

2. A torque calibrating gauge for calibrating a torque responsive device comprising a balanced assembly including a horizontal shaft adapted to be secured to and carried by the output member of the torque responsive device to be rotated thereby, and a vertical disc concentrically secured to the shaft and having a plurality of holes regularly spaced along a diameter of the disc on each side of the center of the disc, and a plurality of balanced weights of regularly graduated values having extensions thereon receivable in the holes of the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

3. A torque calibrating gauge for calibrating a torque responsive device comprising a balanced assembly including a horizontal shaft adapted to be connected to the output member of the torque responsive device to be rotated threby, a pair of antifriction bearings rotatably supporting the shaft in alignment with the output member of the torque responsive device, and a vertical disc concentrically secured to the shaft and having a plurality of holes regularly spaced along a diameter of the disc on each side of the center of the disc, and a plurality of balanced weights of regularly graduated values having extensions thereon receivable in the holes of the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

4. A torque calibrating gauge for calibrating a torque responsive device comprising a balanced assembly including a horizontal shaft adapted to be connected to the output member of the torque responsive device to be rotated thereby, and a vertical disc concentrically secured to the shaft and having a plurality of circular holes regularly spaced along a diameter of the disc on each side of the center of the disc, and a plurality of cylindrical balanced weights of regularly graduated values having substantially cylindrical extensions thereon receivable in the circular holes of the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

5. A torque calibrating gauge for calibrating a torque responsive device comprising a balanced assembly including a horizontal shaft adapted to be connected to the output member of the torque responsive device to be rotated thereby, and a vertical disc concentrically secured to the shaft and having a plurality of circular holes regularly spaced along a diameter of the disc on each side of the center of the disc, and a plurality of cylindrical balanced weights of regularly graduated values having tapered cylindrical extensions thereon receivable in the circular holes of the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

6. A torque calibrating gauge for calibrating a torque responsive device comprising a balanced assembly including a horizontal shaft adapted to be connected to the output member of the torque responsive device to be rotated thereby, and a vertical disc concentrically secured to the shaft and having a plurality of holes regularly spaced along a diameter of the disc on each side of the center of the disc, and a plurality of balanced weights of regularly graduated values having internally tapped extensions thereon receivable in the holes of the disc and headed screws received in the internally tapped extensions for mounting the weights on the disc, said weights being selectively mounted in selected holes along the diameter of the disc providing desired selected weight times distance torque moments resisting rotation of the shaft by the output member of the torque responsive device when the diametrically arranged holes in the disc are horizontally positioned.

7. A torque calibrating gauge for calibrating a torque responsive device comprising a balanced assembly including a horizontal shaft adapted to be connected to the output member of the torque responsive device to be rotated thereby, and a vertical disc concentrically secured to the shaft and having a plurality of holes regularly spaced along a diameter of the disc on each side of the center of the disc and indicia adjacent each hole indicating its distance from the center of the disc, and a plurality of balanced weights of regularly graduated values having extensions thereon receivable in the holes of the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

8. A torque calibrating gauge for calibrating a torque responsive device comprising a balanced assembly including a horizontal shaft adapted to be connected to the output member of the torque responsive device to be rotated thereby, and a vertical disc concentrically secured to the shaft and having a plurality of circular holes regularly spaced along a diameter of the disc on each side of the center of the disc, and a plurality of cylindrical weights of regularly graduated values having substantially cylindrical extensions on one end thereof and indicating lines on the other end thereof which are vertically oriented with respect to the balance of the weights about their longitudinal axes, said cylindrical extensions of the weights being receivable in the circular holes of the discs with said indicating lines of the weights at right angles to said hole containing diameter of the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

9. A torque calibrating gauge for calibrating a torque responsive device comprising a balanced assembly including a horizontal shaft adapted to be connected to the output member of the torque responsive device to be rotated thereby, and a vertical disc concentrically secured to the shaft and having a plurality of holes regularly spaced along a diameter of the disc on each side of the center of the disc, and a plurality of balanced weights of regularly graduated values having internally tapped extensions thereon of greater length than the thickness of the disc and receivable in the holes of the disc and screws received in the internally tapped extensions and provided with cup-shaped heads engaging the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

10. A torque calibrating gauge for calibrating a torque responsive device comprising a balanced assembly including a horizontal shaft adapted to be connected to the output member of the torque responsive device to be rotated thereby, and a vertical disc concentrically secured to the shaft and having a plurality of holes regularly spaced along a diameter of the disc on each side of the center of the disc and a plurality of diametrically opposed large openings for reducing the mass of the disc, and a plurality of balanced weights or regularly graduated values having extensions thereon receivable in the holes of the disc for mounting the weights on the disc, said weights being selectively mounted in selected holes along the diameter of the disc for providing desired selected weight times distance torque moments resisting rotation of the shaft by the output member of the torque responsive device when the diametrically arranged holes in the disc are horizontally positioned.

References Cited by the Examiner

UNITED STATES PATENTS

| | | | |
|---|---|---|---|
| 2,648,219 | 8/53 | Emery | 73—1 |
| 3,027,748 | 4/62 | Brenner | 73—1 |

ISAAC LISANN, *Primary Examiner.*